United States Patent Office 3,483,220
Patented Dec. 9, 1969

3,483,220
PROCESS FOR PREPARING 1-AROYLINDOLE-3-ACETIC ACID COMPOUNDS
Walter A. Gaines, Rahway, and Donald F. Reinhold and Meyer Sletzinger, North Plainfield, N.J., assignors to Merck & Co., Inc., Rahway, N.J., a corporation of New Jersey
No Drawing. Filed May 3, 1967, Ser. No. 635,690
Int. Cl. C07d 27/56
U.S. Cl. 260—326.13          5 Claims

ABSTRACT OF THE DISCLOSURE 1-aroylindole-3-acetic acids are prepared by the Fisher indole synthesis to form the one-unsubstituted indole 3-acetic acid compounds and subsequent acylation in the presence of a tertiary organic base to form the 1-aroyl-indole-3-acetic acid compounds.

Background of the invention

The discovery that 1-aroylindole-3-acetic acids are powerful anti-inflammatory agents has generated practical difficulties in their technical synthesis. In the past in order to aroylate indole acetic acids, it was necessary to protect the acid side chain in order to acylate the ring nitrogen. This ring nitrogen could only by acylated by first activating the ring nitrogen with strong bases such as sodium hydride. Activation of this ring nitrogen also activated the acid side chain so that acylation occurred on the acid side chain as well. To eliminate this undesired acylation, protecting groups such as t-butyl and benzyl were placed on the acid side chain prior to acylation and subsequently removed. There is thus a need for methods whereby acylation could occur without the use of strong bases necessary to activate the ring nitrogen and which at the same time could eliminate the need for a protecting group.

Summary of invention

This invention relates to a process for preparing 1-aroyl-indole-3-acetic acids which can be used as anti-inflammatory agents or converted to other derivatives which can also be used as anti-inflammatory agents. Specifically this invention relates to the preparation of 1-aroyl-2-loweralkyl-5-nitro-3-indolyl acetic acids and esters by acylation of the corresponding 1-unsubstituted compound in the presence of a tertiary organic base.

More specifically, this invention relates to a process for preparing 1 - p - chlorobenzoyl-2-methyl-5-nitro-3-indolyl acetic acid or ester by acylating the corresponding 2-methyl-5-nitro-3-indolyl acetic acid or ester with p-chlorobenzoyl chloride in the presence of triethylamine.

We have found that 5-nitro-indole acetic acids or esters can be readily acylated by reaction in a tertiary organic base such as triethylamine without resorting to the previously required sodium hydride procedure. Further, we have also found that the indole-3-acetic acid can be acylated under these conditions without the need of a protective group for the acid side chain, although the use of a protecting group is still preferred in order to obtain maximum yields.

Detailed description

This invention relates to a process for preparing 1-aroyl-2-loweralkyl-5-nitro-3-indolyl acetic acid and esters of the general formula

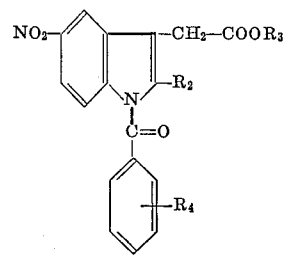

wherein $R_2$ is loweralkyl (such as methyl, ethyl, butyl, pentyl and the like);

$R_3$ is hydrogen, a tertiary loweralkyl (such as t-butyl), benzyl, loweralkenyl (such as allyl) or tetrahydro-2-pyranyl; and $R_4$ is a halo such as (chloro, bromo and fluoro) or a loweralkylthio (such as methylthio, propylthio, pentylthio and the like).

The preferred compounds prepared by the process of this invention are those wherein $R_2$ is methyl, $R_3$ is t-butyl and $R_4$ is chloro or methylthio and is attached to the 4-position of the phenyl ring.

These N-1 aryl-2-loweralkyl-5-nitro-3-indole acid compounds are useful as anti-inflammatory agents and may also be used as intermediates to prepare more active anti-inflammatory agents such as the corresponding 5-dimethylamino compounds. These 5-dimethylamino compounds may be prepared by reducing the corresponding 5-nitro compound to give the corresponding 5-amino compound and reaction of this compound with loweralkyl halides to form the 5-dilower alkylamino compounds. If the 5-dimethylamino compound is desired directly, the 5-nitro compound may be reduced with Raney nickel in the presence of formaldehyde in a methanol-water acetic acid solvent at 50° C. and 40 lbs. pressure. If it is desired, when the 5-diloweralkylamino indole ester compounds are prepared, the corresponding free acid may be obtained by pyrolysis of the t-butyl ester or by reducing the benzyl ester.

The compounds employed as starting materials in this invention are the 2-loweralkyl-5-nitro-3-indolyl acetic acids or esters. These compounds may be prepared by several well known means, for example, by the reaction of p-nitrophenyl hydrazine with levulinic acid or its corresponding ester to form an intermediate phenyl hydrazone which cyclizes under the appropriate reaction conditions to form the indole compound (Fisher indole synthesis). The reaction is normally carried out in aqueous mineral acid, such as 35–45% hydrochloric acid.

The synthesis of the various compounds of this invention starting from the 2-loweralkyl-5-nitro-3-indolyl acetic acid or ester may be described as follows:

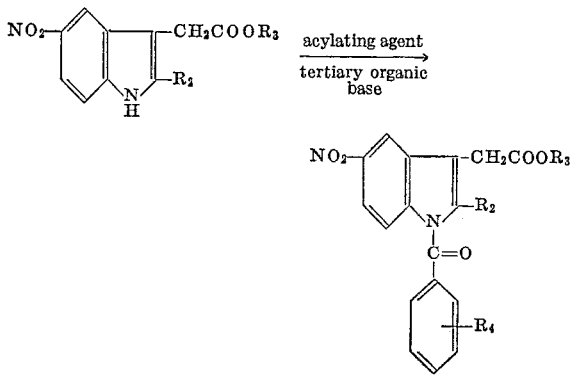

wherein the $R_2$, $R_3$ and $R_4$ groups are as previously defined.

The process of this invention is carried out by reacting the starting indole compounds with an acylating agent in the presence of a tertiary organic base, in an inert solvent.

The acylating agent employed may be the appropriately substituted benzoic acid halide, anhydride, nitrophenyl ester or azide, but preferably the benzoic acid halide and especially the p-chlorobenzoyl chloride.

The tertiary organic bases, an essential feature of this invention, may be one of any number of tertiary organic bases. The critical feature being that the organic base does not have an active hydrogen. Examples of such bases are pyridine, N-alkyl piperidines, dialkyl anilines, trialkylamines, 1,4-diazabicyclo-[2,2,2]-octane and the like. It is preferred however to use trialkylamines and especially triloweralkylamines such as triethylamine, tributylamine and the like.

The solvents used in this reaction are limited solely to the extent that they must be inert to the reaction. Therefore, any inert solvents may be employed, such as toluene, benzene, dimethylformamide, the above-noted organic bases, dioxane, other ethers and the like. It is preferred however, to use such solvents as toluene, benzene or the tertiary organic bases.

The quantities of reactant, temperature and time of reaction are not critical and therefore any suitable combination of quantities, time and temperature may be employed. Variation of the conditions and quantity of reactants will effect the ultimate yield. Therefore in practice, it is preferred to use a ratio of 1:1:1.1 of indole, base and acylating agent, at a temperature range of room temperature to the reflux temperature of the system, with most desirable temperatures above 50° C. such as 80° to 100° C.

The following examples are used by way of illustration.

EXAMPLE 1

Benzyl (1-p-chlorobenzoyl-2-methyl-5-nitro-3-indolyl) acetate

To 180 ml. of dry toluene is added 32.4 gms. of benzyl-2-methyl-5-nitro-3-indolyl acetate followed by the addition of 19.4 ml. of p-chlorobenzoyl chloride and 42 ml. of triethylamine. The reaction mixture is then heated at reflux for 3 hours. The mixture is filtered hot and the filter cake washed with 3× 20 ml. of hot toluene. The filtrate is then cooled to 0–5° C. and aged at 0–5° for one hour and filtered. The filter cake is then washed with 2× 25 ml. of toluene followed by 25 ml. of 95% ethanol. The product is then dried in vacuo at 40–50° C. to yield 43.93 g. benzyl (1-p-chlorobenzoyl-2-methyl-5-nitro-3-indolyl) acetate, M.P. 165–167°, yield 94.7%.

Similarly, when an equivalent quantity of t-butyl (2-methyl-5-nitro-3-indolyl) acetate is used in place of benzyl (2-methyl-5-nitro-3-indolyl) acetate, there is obtained t-butyl (1-p-chlorobenzoyl-2-methyl-5-nitro-3-indoyl) acetate.

Similarly, when benzene or dimethylformamide is used in place of toluene in the above example, there is obtained benzyl (1-p-chlorobenzoyl-2-methyl-5-nitro-3-indolyl) acetate.

Similarly, when temperatures of 60, 75 or 90° C. are used in the above example and the reaction time extended to 5 to 18 hours, benzyl (1-p-chlorobenzoyl-2-methyl-5-nitro-3-indolyl) acetate is obtained.

Similarly, when equivalent quantities of p-chlorobenzoic acid anhydride, p-nitrophenyl p-chlorobenzoate or p-chlorobenzoic acid is used in place of p-chlorobenzoyl chloride in the above example, there is obtained benzyl (1-p-chlorobenzoyl-2-methyl-5-nitro-3-indolyl) acetate.

Similarly, when an equivalent quantity of p-methylthio benzoyl chloride is used in place of p-chlorobenzoyl chloride in the above example, there is obtained benzyl (1-p-methylthio benzoyl-2-methyl-5-nitro-3-indolyl) acetate.

We claim:

1. A process for preparing a compound of the formula:

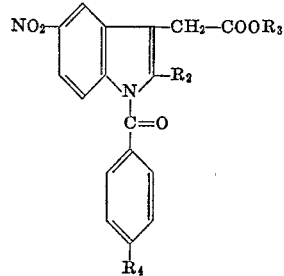

wherein:

$R_2$ is lower alkyl;

$R_3$ is hydrogen, tertiary lower alkyl, lower alkenyl, tetrahydro-2-pyranyl or benzyl; and $R_4$ is halogen or lower alkylthio, which comprises acylating a compound of the formula:

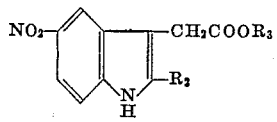

with p-$R_4$-benzoic acid halide, p-$R_4$-benzoic acid anhydride, p-$R_4$-benozic acid azide or nitrophenyl p-$R_4$-benzoate, in the presence of a tertiary amine base and an inert solvent to form the desired product.

2. The process of claim 1 wherein $R_2$ is methyl, $R_3$ is t-butyl or benzyl and $R_4$ is chloro.

3. The process of claim 1 wherein the acylating agent is p-$R_4$-benzoyl chloride.

4. The process of claim 1 wherein the tertiary organic base in triethylamine.

5. A process for preparing benzyl (1-p-chloro-benzoyl-2-methyl-5-nitro-3-indolyl) acetate which comprises acylating benzyl 2-methyl-5-nitro-3-indolyl acetate with p-chlorobenzoyl chloride in an inert solvent in the presence of triethylamine at a temperature above 50° C.

References Cited

UNITED STATES PATENTS 3,390,154    6/1968    Gal _____ 260—326.13

ALEX MAZEL, Primary Examiner

J. A. NARCAVAGE, Assistant Examiner

U.S. Cl. X.R.

260—326.12

PO-1050
(5/69)

UNITED STATES PATENT OFFICE
CERTIFICATE OF CORRECTION

Patent No. 3,483,220          Dated December 9, 1969

Inventor(s) Walter A. Gaines, Donald F. Reinhold and Meyer Sletzi

It is certified that error appears in the above-identified patent and that said Letters Patent are hereby corrected as shown below:

Column 4, line 14, after "acid" add -- azide --;
line 49, "p-$R_4$-benozic" should read -- p-$R_4$-benzoic --;
line 57, "in" should read -- is --.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents